Aug. 19, 1952 H. GILLERSTROM 2,607,441
AIR LINE LUBRICATOR FOR PNEUMATIC TOOLS
Filed Oct. 27, 1948
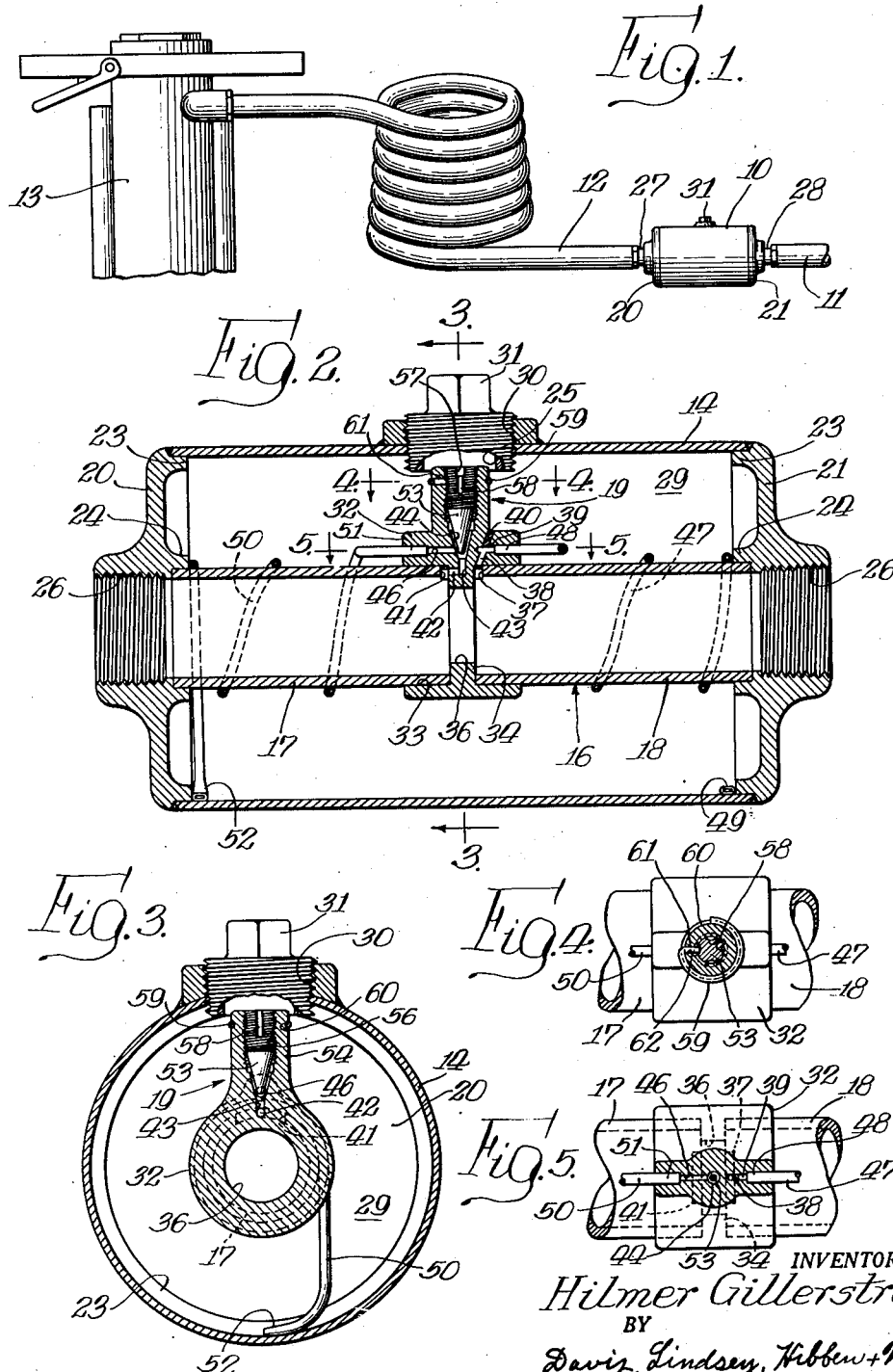
INVENTOR.
Hilmer Gillerstrom,
BY
Davis, Lindsey, Hibben + Noyes
Atty's.

Patented Aug. 19, 1952

2,607,441

UNITED STATES PATENT OFFICE 2,607,441

AIR LINE LUBRICATOR FOR PNEUMATIC TOOLS

Hilmer Gillerstrom, Arcadia, Calif., assignor to Independent Pneumatic Tool Company, Aurora, Ill., a corporation of Delaware Application October 27, 1948, Serial No. 56,724

6 Claims. (Cl. 184—55)

This invention relates to pneumatic tools and more particularly to a lubricating unit adapted to be connected in the air supply line of a pneumatic tool or machine and by which lubricating oil may be injected into the air stream and mixed therewith for transmission to the moving parts of the tool contacted by the air. The structure of the present invention is generally similar to the line oiler disclosed in my copending application Serial No. 775,709, filed September 24, 1947, now Patent No. 2,585,457, but contains certain changes or modifications comprising improvements thereover and by which the line oiler may be adapted for special uses.

One of the principal objects of the present invention is to provide an improved line oiler for pneumatic tools and machines having a baffle means in the main air conduit extending completely around the inner periphery thereof into the path of flow of the air passing therethrough so as to create an extended area of considerably reduced air pressure on the forward side thereof and an extended area of considerably increased air pressure on the rearward side thereof.

Another object of the present invention is to provide a line oiler of the character defined in the preceding object and in which the baffle means is formed by an annular abutment extending inwardly between the adjacent ends of two cylindrical sections comprising the main conduit and to which the sections are secured.

A further object of the invention is to provide a line oiler having a baffle means in the main air conduit extending into the path of flow of the air passing therethrough so as to create an area of reduced air pressure in the forward side thereof and an area of increased pressure on the rearward side thereof, conduit means connecting said areas of reduced and increased pressure to an oil chamber and valve means connected with said conduit means for positively regulating the amount of oil injected into the oil stream.

Other objects and advantages of the present invention will become apparent as the following description progresses, reference being had to the accompanying drawing, in which:

Figure 1 is a perspective view showing the general manner in which the improved lubricating unit is connected in the air supply line to a pneumatic tool, the tool and said supply line being broken away;

Fig. 2 is a vertical, longitudinal sectional view of an oil lubricator in detached condition and comprising a preferred embodiment of the present invention;

Fig. 3 is a vertical, transverse sectional view taken on the line 3—3 in Fig. 2 looking in the direction of the arrows;

Fig. 4 is a horizontal, sectional view taken on the line 4—4 in Fig. 2, looking in the direction of the arrows; and Fig. 5 is a horizontal, sectional view taken on the line 5—5 in Fig. 2, looking in the direction of the arrows.

The air line lubricating unit or line oiler comprising a preferred embodiment of the present invention is indicated generally in Fig. 1 by the reference numeral 10 and is connected in the air supply line comprising flexible hose sections 11 and 12. The supply line section 11 of the hose may be connected to a source of air pressure such as a compressor (not shown), and the air line section 12 is connected to the upper end of a pneumatic tool 13, shown somewhat diagrammatically in Fig. 1 and with the lower portion thereof broken away. The lubricating unit 10 is positioned in the air line between the hose sections 11 and 12 and serves to supply the air passing therethrough under pressure with the desired quantity of oil, the air and oil thereafter passing on through the air line section 12 to the tool 13 where the oil is conveyed to the various moving parts and surfaces to be lubricated.

Referred now more particularly to Figs. 2 to 5, inclusive, of the drawing, the line oiler 10 comprises an outer tubular casing or shell 14 of seamless tubing and an inner tubular unit, indicated generally by the numeral 16, of lesser diameter and arranged concentrically therein. The inner tubular unit 16 comprises two sections 17 and 18 also of seamless tubing which are joined together at their inner ends by a valve means or unit, indicated generally by the numeral 19. The outer casing 14 and the inner tubular unit 16 are supported and maintained in proper concentric relationship by annular end caps 20 and 21 secured to the respective ends thereof. The end caps 20 and 21 are of identical construction and each has inwardly and longitudinally directed and radially spaced annular flanges 23 and 24 forming seating shoulders for the respective ends of the outer shell 14 and outer ends of the inner tubular sections 17 and 18, respectively. The ends of the outer shell 14 are supported on and welded to the annular flanges 23 and the outer ends of inner tubular sections 17 and 18 are supported within and welded to the annular flanges 24.

The end caps 20 and 21 are also formed with central, longitudinally extending openings 26 which are of substantially the same diameter as the inside diameter of the inner tubular sections 17 and 18. The cap openings 26 are internally threaded and are adapted to receive the threaded ends 27 and 28 (Fig. 1) of the air supply line sections 12 and 11, respectively, for connecting the line oiler 10 into the air supply line.

The annular space 29 between the outer shell 14 and the inner tubular sections 17 and 18 which is closed on the ends by the end caps 20 and 21, constitutes an oil chamber or reservoir from which oil may be injected or fed into the air stream in a manner to be described hereinafter, as it passes through the inner tubular unit 16 from the air line hose section 11 to the hose section 12. The outer shell 14 is also provided with a circular threaded opening 30 in which a threaded drain plug 31, having a bore 25 in the lower end thereof, is secured. By means of the drain plug 31 access to the annular oil chamber 29 is provided for the purpose of adding or draining oil and for adjusting the valve unit 19, as will be more fully described hereinafter.

The valve unit 19, by which the quantity of oil being fed into the air stream may be positively adjusted and controlled as desired in addition to the self-adjusting character of the unit resulting from changes in air pressures and velocity, comprises an annular body portion 32 having a longitudinally extending opening 33 therethrough. Intermediate the ends of the opening 33 there is formed an inwardly projecting annular flange or abutment 34 providing an opening 36 of a lesser diameter than the inside diameter of the inner tubular sections 17 and 18. The respective inner ends of the tubular sections 17 and 18 are received and supported within the valve body opening 33 and abut the annular flange 34. The valve body 32, therefore, serves as a joining means or connecting member for joining the inner tubular sections 17 and 18 and permits the air from section 18 to pass through its restricted opening 36 and into the section 17.

At its inner end immediately adjacent the rearward side of the annular abutment 34, the inner tubular member 18 is notched or cut away so as to form an opening 37 in alignment with a diagonal channel 38 in the valve body 32 which merges with a channel 39 extending longitudinally in the valve body in parallel relationship with the tubular section 18. The diagonal channel 38 may be formed by drilling diagonally downwardly through the valve body 32, after which the outer or upper portion of the drilled opening may be filled in as at 40 to seal the same. On the other or forward side of the abutment 34, the inner end of the tubular member 17 is also notched or cut away immediately adjacent the abutment so as to form an opening 41 which connects with a longitudinal channel 42 in the abutment 36 which connects with the lower end of a radially directed channel 43 in the valve body 32 extending upwardly and widening out to form a tapered valve seat 44. Another channel 46 extends longitudinally from the tapered valve seat in parallel relationship with the tubular section 17 and opens through the side face of the valve body 32.

A section of seamless steel tubing 47 having a relatively small inside diameter is wound spirally about and tightly against the outer surface of the inner tubular member 18, the left end 48 of the tubing 47 extending longitudinally or horizontally and being received and secured within the channel 39 of the valve body 32. The other or right end portion of the tubing 47 extends radially downwardly adjacent the end cap 21 and curves into an open flared end or mouth 49 in engagement with the inner periphery of the shell 14. In similar manner, another length of seamless steel tubing 50 is wound tightly about the outer surface of the other inner tubular member 17 and has its right end 51 extending longitudinally or horizontally and secured within the channel 46 of the valve body 32. The left end of the tubing 50 extends radially downwardly and, like the tubing 47, also curves into an open flared end or mouth 52 engaging the inner periphery of the shell 14.

The internal annular abutment 34 of the valve body 32 serves as a baffle in the path of the incoming air and is of a restricted height or extent so as not to impede to any great extent the flow of air through the unit. However, the height of the baffle 34 is sufficient in conjunction with the openings 37 and 41 in the tubular sections 18 and 17 to assist in the oil feeding operation which will now be described. With the line oiler 10 connected in the air line as shown in Fig. 1 and with the oil reservoir 29 filled with oil having the proper characteristics for forming a spray to be carried by air under pressure, the pneumatic tool may be operated in the usual manner. Air under pressure passes from the supply line 11 into the inner tubular member 18 through which it passes on through the restricted baffle opening 36 and on through the inner tubular member 17 into the supply line 12. When the air passes from the inner tubular section 18 into the tubular section 17, it strikes the annular abutment or baffle 34 causing a concentration and a considerable increase of air pressure in the area immediately before or rearwardly of the baffle, with the result that a considerable quantity of air under pressure is forced outwardly through the aperture 37 into the channels 38 and 40 of the valve body 32 and into the small tubing 47, the greater portion of the air passing on through the baffle opening 36.

After entering the small tubing 47, the air under pressure continues in a reverse direction and emerges from the flared mouth 49 into the oil chamber 29. Because of this air pressure within the chamber 29, the oil at the other end of the chamber 29 is forced upwardly through the flared mouth 52 within the other small tubing 50 through which it passes rearwardly into and through the channels 46, 44, 43 and 42, respectively, in the valve body 32 and out through the opening 41 in the inner tubular section 17 on the forward side of the baffle 34. The baffle 34 creates an area of reduced air pressure on the forward side thereof and particularly in the vicinity of the opening 41, thus creating an injection or aspirating action withdrawing oil from the valve body 32 in the form of a fine spray and forcing it into the main air stream by which it is carried to the moving parts of the pneumatic tool.

Because of the fact that the baffle 34 extends entirely around the inner periphery of the inner tubular unit 16, the areas of increased and decreased pressure extend entirely around the inner periphery thereof on the forward and rearward sides of the baffle 34 and, hence, are of greatly increased size as compared to a baffle of limited size and extent restricted to a smaller area immediately adjacent the openings 37 and 41. In addition to increasing the sizes of the areas of increased and decreased air pressures, the complete annular baffle 34 also serves to increase to a greater degree the air pressure adjacent the opening 37 on the forward side and to decrease to a lower degree the air pressure adjacent the rearward side of the baffle.

It is apparent that the line oiler 10 thus far described is self-adjusting or self-regulating as to the quantity of oil being supplied to the tool. When the pressure and velocity of the air passing through the oiler is increased, the amount of oil will be proportionately increased. Conversely, when the air pressure is reduced, the quantity of oil passing into the air stream will also be reduced. However, in order that the amount of oil being fed or sprayed into the air stream may be varied as desired, when due to certain operating conditions the quantity of oil required for efficient tool operation should be increased or reduced out of proportion to the pressure and velocity of the air, there is provided a needle valve 53 having a lower tapered end portion and an upper threaded portion. The valve body 32 also is provided with an upstanding portion 54 in register with the drain opening 30 and having a central bore 56 connecting with the tapered valve seat 44. The upper end of the bore 56 is threaded to provide for a threaded engagement with the upper threaded end of the needle valve 53, this threaded construction permitting the needle valve 53 to be adjusted upwardly or downwardly with respect to the valve seat 44. The upper end of the needle valve 53 is provided with a kerf 57 by which the needle valve 53 may be rotated by means of a screw driver inserted downwardly through the outer shell opening 30 after the plug 31 has been removed.

When it is desired to feed a maximum quantity of oil into the air stream, the needle valve 53 may be rotated upwardly until the longitudinal channel 46, the lower end of the valve seat 44 and the channel 43 are free and unobstructed, thus permitting oil and air to pass readily in relatively large volume through the valve body 32 into the air stream. However, if the conditions of operation require a lesser amount of oil, the valve 53 may be screwed downwardly to partially close the passages, thus restricting the amount of oil and air that may pass therethrough.

Because of the fact that tool and compressor vibration is transmitted through the supply lines 12 and 11 to the line oiler 10, provision is made to positively retain the needle valve 53 in the desired position to which it may be adjusted by a resilient, yieldable retaining means. Without such means, the needle valve 53 would be rotated by the vibration so as to further open or close the valve opening and permit a greater or lesser amount of oil than desired to be injected into the air stream. To prevent misadjustment by vibration, the needle valve 53, as shown in Fig. 4, is provided with four grooves 58 along its upper threaded portion, the grooves 58 being equally spaced ninety degrees apart about the outer periphery of the needle valve 53. A spring lock ring 59 is frictionally retained in an annular groove 60 formed in the outer periphery of the upstanding portion 54 of the valve body 32 adjacent its upper end. One end 61 of the lock ring 59 is turned inwardly through an aperture 62 extending through to the inner bore of the valve body portion 54 and is adapted to project into the slots 58 of the valve 53 to prevent its inadvertent rotation in one direction or the other. When the needle valve 53 is to be adjusted, it may be positively rotated by a screw driver, the end 61 of the lock ring 59 being forced out of locking position in the slot 58 and permitting the valve 53 to be turned to the desired position of adjustment. When the new position of adjustment is reached, the locking end 61 of the ring 59 snaps into the next groove 58 to thereafter hold the needle valve 53 against movement resulting from vibration. The lock ring end 61, therefore, is yieldable and during the adjustment may snap into and out of the grooves 58.

It is apparent from the foregoing description of the construction and mode of operation of the prefered embodiment that an air line oiler has been provided which is inexpensive and relatively simple in structure and which may be readily assembled and serviced. It is of rugged and sturdy construction and hence it is capable of withstanding rough handling and usage by inexperienced operators. Furthermore, the oiler may be operated from either end so that it is reversible, the operation thereof being substantially the same and equally efficient in either position. Hence, an operator need not pay particular attention as to which end cap 20 or 21 is connected to the supply line 11.

In the event the air supply line 11 is connected to the end cap 20 of the oiler instead of the end cap 21 as shown in Fig. 2, so that the compressed air is supplied into the oiler from the left as viewed in Fig. 2 rather than from the right as described in detail above, areas of increased and reduced air pressure are formed on the left and right sides of the baffle 34 and a considerable amount of air passes into the valve body 32 through the opening 41 and through the channels 42, 43, 44 and 46 into the small tubing 50. The air then passes backwardly through the tubing 50 and out through the tubing mouth 52 into the oil chamber 29, and then oil is forced into the other small tubing 47 through the valve body 32 through the channels 39 and 38 therein and out through the main conduit opening 37 into the air stream. The needle valve 53 serves in this instance, when the air stream is passing from left to right as viewed in Fig. 2, to regulate the amount of air which may be admitted into the oil chamber 29, whereas when the air stream passes from right to left, the valve 53 serves to regulate the amount of oil to be received from the oil chamber. However, regardless of the direction in which the line oiler is being operated and whether the amount of air or oil is being regulated, the net result is substantially the same in that the amount of oil forced into the air stream is controlled by the needle valve 53.

Although there has been illustrated in the accompanying drawing and described in detail above a preferred embodiment of an air line oiler for air supply lines of pneumatic tools and machines, it will be apparent that changes in the details of structure and mode of operation may be made without departing from the spirit and scope of the appended claims.

I claim:

1. An air line lubricator for pneumatic tools comprising a hollow outer casing having a drain and fill opening therein, a main conduit supported within said outer casing in spaced relation thereto, the space between said casing and conduit forming an oil chamber and the conduit being adapted to receive and conduct air under pressure, baffle means within said conduit extending into the path of flow of said air for creating an area of reduced air pressure on the forward side thereof and an area of increased pressure on the rearward side thereof, said main conduit having openings though its walls on each side of the baffle means and closely adjacent thereto in said areas of increased and reduced air pressures, conduit means connecting said opening in the area of increased air pressure with said oil chamber and conduit means connecting said oil chamber with the opening at said area of decreased pressure, and adjustable valve means associated with said conduit means for regulating the amount of oil being fed into the air stream and in alignment with the drain and fill opening of said outer casing to facilitate access to and adjustment of said valve means.

2. An air line lubricator for pneumatic tools and machines comprising a main conduit through which air under pressure may pass, baffle means within said conduit extending into the path of flow of said air for creating an area of reduced air pressure on the forward side thereof and an area of increased pressure on the rearward side thereof, a casing spaced from said conduit and defining an oil chamber therebetween, said main conduit having openings through its walls on each side of the baffle means and closely adjacent thereto in the areas of reduced and increased air pressures, unitary valve means on the outside of said main conduit comprising a valve body having independent passages each connected at one end thereof through said body with one of said main conduit openings and a valve member mounted for adjustable movement in said body to restrict the effective opening of one of said passages, and independent conduit means connecting the opposite end of each of said valve passages with said oil chamber.

3. An air line lubricator for pneumatic tools and machines comprising a main conduit through which air under pressure may pass, a casing spaced from said main conduit and defining an oil chamber therebetween, baffle means within said conduit extending into the path of flow of said air for creating an area of reduced air pressure on the forward side thereof and an area of increased pressure on the rearward side thereof, said main conduit having openings through its walls in the areas of reduced and increased air pressures, valve means on the outside of said main conduit comprising an annular valve body having independent passages therethrough connected with said main conduit openings and an upstanding portion providing a valve chamber connected with one of said passages and a valve mounted in said chamber for adjustable movement to restrict the effective opening of said one passage, and conduit means connecting said valve passages with said oil chamber and extending about the outside of said main conduit.

4. An air line lubricator for pneumatic tools and machines comprising a main conduit including two elongated tubular sections arranged in substantial alignment in end to end relationship and through which air under pressure may pass, a casing spaced from said main conduit and defining an oil chamber therebetween, combined joint and valve means comprising a body member having an annular connecting portion extending around said main conduit and an annular baffle extending radially inwardly between said sections into the path of flow of said air and creating an area of reduced air pressure on the forward side thereof and an area of increased air pressure on the rearward side thereof, the adjacent ends of said tubular sections being received within said connecting portion in endwise abutment with said baffle for joining the sections together, said main conduit having openings therethrough in the areas of increased and reduced pressure, and said body member also being provided with independent passages therethrough connected with said main conduit openings, an outwardly extending portion in said body member defining a valve chamber connected with one of said passages, a valve member mounted for adjustable movement in said valve chamber to restrict the effective opening of said one passage, and conduit means connecting said valve passages with said oil chamber.

5. An air line lubricator for pneumatic tools and machines comprising a main conduit through which air under pressure may pass, a casing spaced from said main conduit and defining an oil chamber therebetween, baffle means within said conduit extending into the path of flow of said air for creating an area of reduced air pressure on the forward side thereof and an area of increased pressure on the rearward side thereof, said main conduit having openings through its walls in the areas of reduced and increased air pressures, valve means on the outside of said main conduit comprising a valve body having independent passages therethrough connected with said main conduit openings, a valve mounted for adjustable movement in said body to restrict the effective opening of one of said passages and resilient retaining means carried by said body and engaging said valve for holding the same in adjusted position but permitting positive adjusting movement thereof, and conduit means connecting said valve passages with said oil chamber.

6. An air line lubricator for pneumatic tools and machines comprising a main conduit including a pair of elongated tubular sections arranged in end-to-end relation and through which air under pressure may pass, the adjacent ends of said sections being provided with notched openings, a casing spaced outwardly from said main conduit and defining an oil chamber therebetween, combined joint and valve means comprising an annular body portion having a radial inwardly extending baffle, said adjacent ends of said tubular sections being received within said body portion in endwise abutment with said baffle for connecting said ends together, said body portion having independent fluid passages communicating therethrough with said notched openings, an adjustable valve member extending radially into said body portion for restricting the effective opening of one of said passages, and conduit means connecting said fluid passages with said oil chamber.

HILMER GILLERSTROM.

REFERENCES CITED

The following references are of record in the file of this patent:

UNITED STATES PATENTS

| Number | Name | Date |
|---|---|---|
| 1,751,714 | Peters | Mar. 25, 1930 |
| 1,834,172 | Osgood | Dec. 1, 1931 |
| 1,907,465 | Terry | May 9, 1933 |
| 2,098,574 | Doyle | Nov. 9, 1937 |
| 2,304,644 | Heftler | Dec. 8, 1942 |
| 2,308,773 | Norgren | Jan. 19, 1943 |